United States Patent [19]

Biagini

[11] Patent Number: 4,830,096
[45] Date of Patent: May 16, 1989

[54] REMOVABLE THERMAL CONTROL SYSTEM

[75] Inventor: Guido Biagini, Cherry Valley, Ill.

[73] Assignee: Sundstrand Corporation, Rockford, Ill.

[21] Appl. No.: 872,871

[22] Filed: Jun. 11, 1986

[51] Int. Cl.⁴ .................. B60H 1/32; F25D 19/00; B64C 1/00

[52] U.S. Cl. .................. 165/41; 244/118.5; 244/120; 403/12; 220/319; 220/320; 220/321; 62/239; 62/298; 62/299

[58] Field of Search ............... 165/41; 62/298, 299, 62/239; 244/131, 120, 118.5; 220/321, 320, 319; 403/12

[56] References Cited

U.S. PATENT DOCUMENTS

| | | | |
|---|---|---|---|
| 1,901,699 | 3/1933 | Burpee | 220/321 |
| 2,022,868 | 12/1935 | Nelson | 220/319 |
| 2,102,908 | 12/1937 | Nelson | 220/320 |
| 2,439,161 | 4/1948 | Du Bois | 220/319 |
| 2,511,875 | 6/1950 | Protzeller . | |
| 2,511,876 | 6/1950 | Protzeller . | |
| 2,549,110 | 4/1951 | Michael | 244/131 |
| 2,553,220 | 5/1951 | Troeger | 220/320 |
| 2,630,688 | 3/1953 | Merkling . | |
| 2,976,806 | 3/1961 | Risk et al. | 244/120 |
| 3,043,410 | 7/1962 | Pearson | 244/131 |
| 3,125,867 | 3/1964 | Rath . | |
| 3,421,340 | 1/1969 | Von Berg . | |
| 3,592,019 | 7/1971 | Beaudet . | |
| 3,640,492 | 2/1972 | Star | 244/131 |
| 3,703,265 | 11/1972 | Troitino | 244/120 |
| 3,771,321 | 11/1973 | Maksy . | |
| 4,057,104 | 11/1977 | Altoz | 165/41 |
| 4,109,485 | 8/1978 | Grosskopf . | |
| 4,399,665 | 8/1983 | Evans et al. . | |

FOREIGN PATENT DOCUMENTS

| | | | |
|---|---|---|---|
| 538644 | 3/1957 | Canada | 244/120 |
| 1299364 | 9/1961 | France | 220/321 |
| 1390152 | 1/1965 | France | 244/120 |
| 1462186 | 11/1966 | France | 244/120 |
| 7605524 | 11/1977 | Netherlands | 220/321 |
| 449507 | 4/1968 | Switzerland | 220/321 |
| 731660 | 6/1955 | United Kingdom | 244/120 |
| 86/01175 | 2/1986 | World Int. Prop. O. | 244/120 |

Primary Examiner—Albert W. Davis, Jr.
Assistant Examiner—John K. Ford
Attorney, Agent, or Firm—Wood, Dalton, Phillips, Mason & Rowe

[57] ABSTRACT

An environmental control system for affording quick attachment and disconnection of a thermal control unit with respect to an aircraft pod or other like vehicular substructure. A complementary interengaging mechanism is provided between the thermal control unit and the aircraft pod for properly positioning the control unit with respect to the pod. A complementary interengaging locking mechanism is provided between the thermal control unit and the aircraft pod for locking the control unit to the pod when so positioned. Complementary fluid connections and electrical connections on the thermal control unit and the aircraft pod are located for interconnection automatically in response to positioning and locking the control unit to the pod.

21 Claims, 2 Drawing Sheets

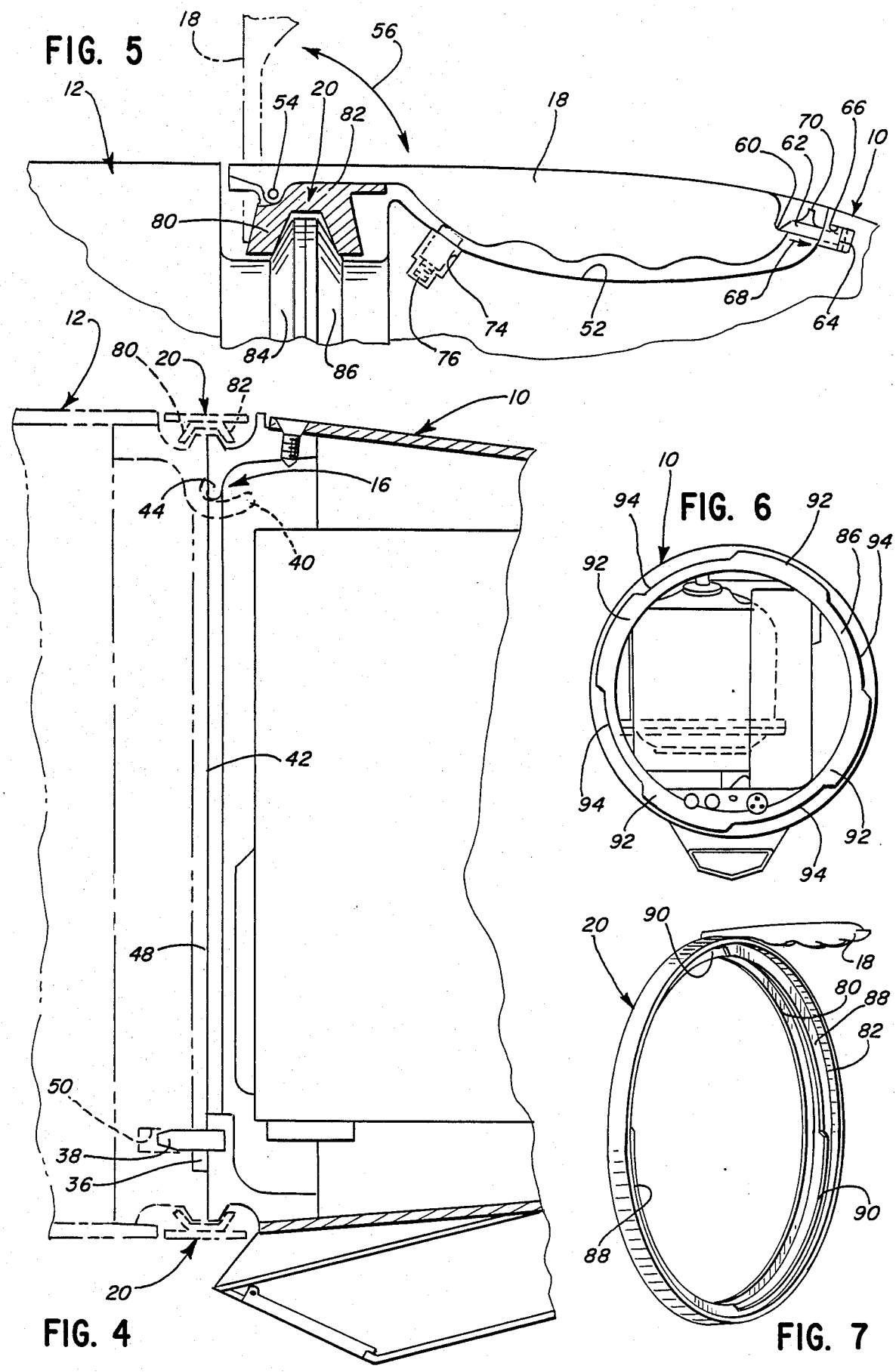

REMOVABLE THERMAL CONTROL SYSTEM

FIELD OF THE INVENTION

This invention generally relates to cooling systems and, particularly, to an environmental control system for affording quick attachment and disconnection of a thermal control unit with respect to an aircraft pod or other like vehicular substructure.

BACKGROUND OF THE INVENTION

There are a wide range of environmental control systems in the aviation industry, such as refrigeration systems for cooling various control or operative components or systems. For instance, vapor cycle cooling systems are used on aircraft as environmental control units to cool various components during operation.

Certain aircraft have substructures, commonly called "pods" which house computers, cameras, thermo-imagers, lasers, and other mechanisms and motors to move the cameras or other devices during operation. Umbilical cords feed back to the aircraft cockpit or other areas as information lines from the instruments within the pods. Of course, a wide range of other instruments or components commonly are housed in pods or other similar substructures. The operative mechanisms of these instruments or components often must be cooled by some form of refrigeration or thermal control unit such as a vapor cycle cooling system.

One of the major problems with such support systems is the maintainability or serviceability thereof. A vapor cycle cooling system includes such mechanisms as compressors, evaporators, condensers, condenser fans, motors and related control mechanisms. Should any of these devices become inoperative, heretofore it has been common either to make attempts to replace or repair the inoperative device or to remove the entire thermal control unit and replace the unit with a completely operative system. In the past, such maintenance or service required a variety of tools and consumed an inordinate amount of time. When dealing with maintainability or serviceability on the flight line, time consumption can be disasterous. These problems are magnified when maintenance or servicing must be done in circumstances of rain, wind or cold conditions, as well as when dealing with non-technical maintenance personnel.

There is a need for and this invention is directed to providing a new environmental control system wherein a thermal control unit can be attached and disconnected readily and with speed, and without requiring any tools whatsoever. The invention provides a support system affording maintainability and serviceability not heretofore available.

SUMMARY OF THE INVENTION

An object, therefore, of the invention is to provide a new and improved environmental control system for affording quick attachment and disconnection of a thermal control unit with respect to an aircraft pod or other vehicular substructure, thereby providing a support system with improved maintainability and serviceability.

In the exemplary embodiment of the invention, the system generally includes complementary interengaging locating means between the thermal control unit and the aircraft pod for properly positioning the control unit with respect to the pod. Complementary interengaging locking means are provided between the thermal control unit and the aircraft pod for locking the control unit to the pod when so properly positioned. Complementary fluid connections and electrical connections are provided on the thermal control unit and the aircraft pod, the connections being located for interconnection automatically in response to positioning and locking the control unit to the pod.

Another feature of the invention includes a complementary interengaging guide means between the thermal control unit and the aircraft pod for guiding the control unit into proper position. The guide means include at least one guide pin on one of the control unit or pod and a guide aperture on the other of the control unit or pod for receiving the guide pin.

The locating means include a hanger member on the aircraft pod for initially receiving a locating pivot pin on the thermal control unit whereby the control unit can be simply located and allowed to be easily lowered by pivoting into proper position with respect to the pod, as the guide pin and guide aperture guide the control unit into position.

The locking means include a peripheral locking ring having angularly spaced locking segments. The ring is generally V-shaped in cross-section in a generally inwardly opening direction and embraces radially outwardly projecting annular flanges on both the thermal control unit and the aircraft pod. One leg of the V-shaped locking ring forms a continuous circular flange to permanently mount the locking ring behind the flange means of one of the control unit and pod. The other leg of the V-shaped is formed with angularly shaped locking segments for interlocking engagement with permanent angularly spaced locking segments on the other of the control unit and pod.

Lastly, another feature of the invention includes manually manipulatable handle means pivotally mounted on the locking ring for swinging movement about a generally tangentially extending axis. Therefore, the handle can project radially outwardly for easy rotation of the locking ring and be pivoted alongside either the control unit or pod during flight. Preferably, the handle is pivoted into a recess within the outer bounds of the surrounding structure and is held within the recess by latch and release means.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 4 is an axial section, on an enlarged scale, illustrating the interface between the thermal control unit and the pod when the control unit is in fully locked condition;

FIG. 5 is a fragmented section, on an enlarged scale, illustrating in greater detail the components of the locking handle and locking ring;

FIG. 6 is an end elevational view of the locking segments at the interface of the thermal control unit; and FIG. 7 is a perspective view of the segmented locking ring.

DETAILED DESCRIPTION OF THE PREFERRED EMBODIMENT

Figure 1:
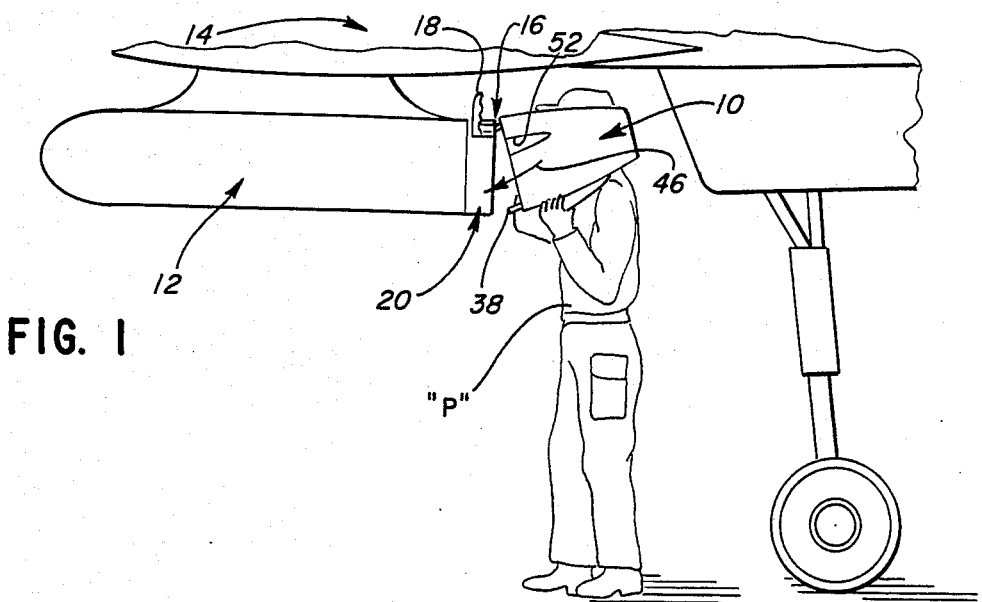
FIG. 1 is an elevational view illustrating the thermal control unit being initially located onto the pod by service personnel.

Referring to the drawings in greater detail, and first to FIG. 1, the invention generally is embodied in an environmental control system for affording quick attachment and disconnection of a thermal control unit, generally designated 10, with respect to a vehicular substructure such as a pod, generally designated 12, depending from the underside of an aircraft, generally designated 14.

The system is designated for efficient maintainability and serviceability on a flight line by service personnel "P" without the use of any tools. As shown in FIG. 1, thermal control unit 10 is easily handled on the shoulder of the service individual and initially hooked onto complementary interengaging locating means, generally designated 16, for properly positioning the control unit with respect to pod 12.

Figure 2:
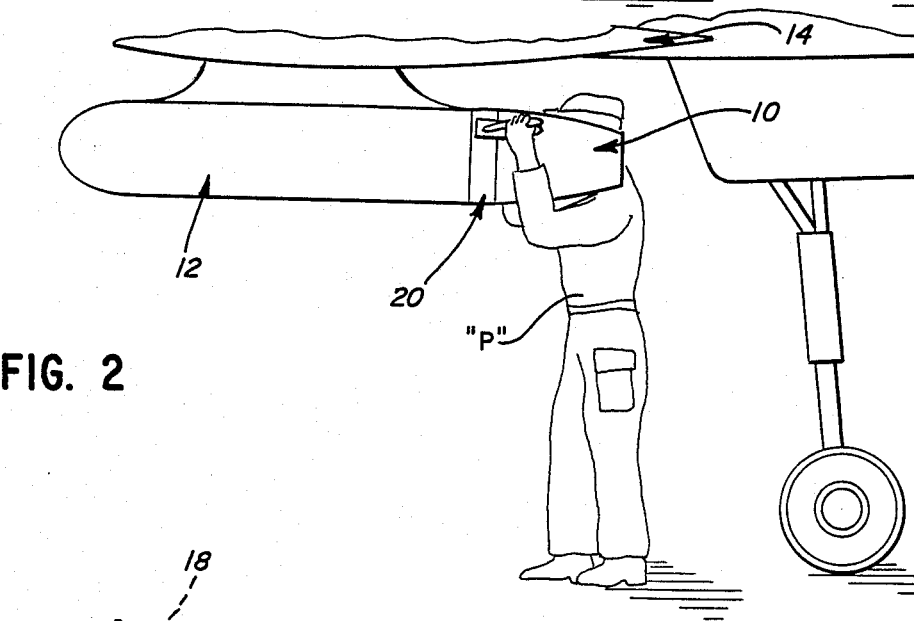
FIG. 2 is a view similar to that of FIG. 1 with the thermal control unit being finally positioned and locked in place.

FIG. 2 shows that control unit 10 then simply is lowered into interfacing position and is locked in that position simply by manipulation of a locking handle 18 operatively associated with a rotatable locking ring, generally designated 20 and described in greater detail hereinafter. As stated, the thermal control unit is located and locked in proper position without the use of tools within a matter of a few minutes, versus the lengthy time (from an hour to a day) required in the past to service and maintain control or cooling systems heretofore available.

Figure 3:
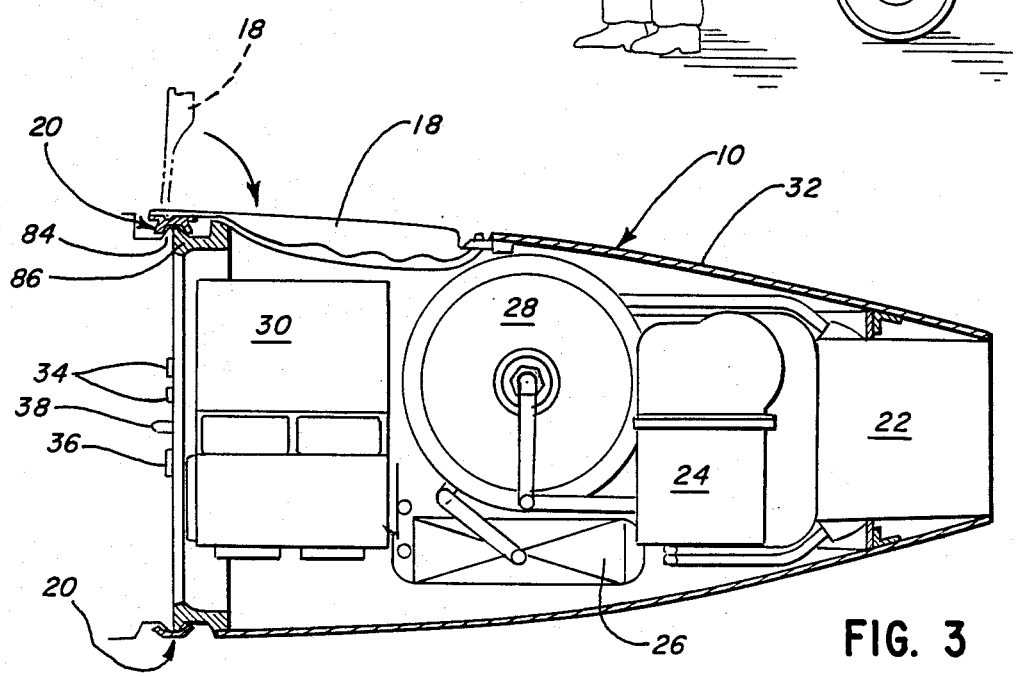
FIG. 3 is an axial section, on an enlarged scale, taken through the thermal control unit and through the recess for receiving the locking handle.

Referring to FIG. 3, thermal control unit 10 comprises a vapor cycle cooling system which includes conventional components such as a condensor 22, a condensor fan 24, an evaporator 26, a compressor 28 and a control module 30. All of these components are located within a housing 32 which has a shape to form a continuation of the contour of pod 12 as shown in FIG. 2. Locking handle 18 also is shown in FIG. 3 along with its associated components which will be described in greater detail hereinafter.

Thermal control unit 10 includes coolant connections 34 and electrical connections 36 which mate with complementary fluid connections and electrical connections on pod 12 as also will be described hereinafter. These fluid and electrical connections interconnect with the connections on the pod automatically in response to positioning and locking the control unit to the pod. Lastly, FIG. 3 also shows a guide pin 38 for guiding the thermal control unit into position with respect to the pod, as will be seen below.

Referring to FIG. 4, the system of this invention includes complementary interengaging locating means 16 between thermal control unit 10 and aircraft pod 12 for properly positioning the control unit with respect to the pod. More particularly, the pod includes a hanger member 40 projecting outwardly therefrom beyond an interface surface 42 thereof. The hanger is located near the top edge of the pod for receiving a pivot member 44 on thermal control unit 10. In essence, the pivot member 44 allows the control unit initially to be located at the top edge thereof, as previously illustrated in FIG. 1, and easily lowered by pivoting into proper position with respect to the pod as illustrated in FIG. 4. This is shown by arrow 46 in FIG. 1. It immediately can be seen that the control unit is properly located with respect to the pod by service individual without the need of any tools whatsoever.

FIG. 4 also shows complementary interengaging guide means between thermal control unit 10 and aircraft pod 12 for guiding the control unit into proper position while the control unit is lowered, by pivoting, as described above. Specifically, the guide means include guide pin 38 which projects axially from an interface surface 48 of the control unit and which is receivable in a guide aperture 50 in interface surface 42 of pod 12.

FIG. 5 shows in greater detail the operative association between locking handle 18 and locking ring 20. Specifically, locking handle 18 is stored within a recess 52 in the outer surface of thermal control unit 10 when the control unit is fully locked to aircraft pod 12 as described hereinafter. The locking handle is pivotally mounted to locking ring 20 by a generally tangentially extending pivot pin 54 which allows the locking handle to be moved in the direction of double-headed arrow 56 to an operative position projecting radially outwardly of the system, as shown in phantom.

Latch and release means are provided within recess 52 of thermal control unit 10 to lock handle 18 within the recess, as shown in FIG. 5, and to release or eject the handle to its operative condition. More particularly, the handle has a locking shoulder 60 on the distal end thereof which seats under a latch member 62 which is spring loaded, as at 64, in a bore 66 in control unit 10. Spring 64 biases latch 62 outwardly over shoulder 60 of the handle. When it is desired to release the handle for unlocking purpose, latch 62 is moved inwardly in the direction of arrow 68, against the biasing of spring 64. A thumb tab 70 is provided for this purpose. Upon moving the latch out of engagement with locking shoulder 60, an ejector plunger 72 biases the handle out of recess 52 whereupon it can be manually grasped for pivotal movement to its operative condition. Plunger 72 is mounted within a counterbored recess 74 and is spring loaded by spring means 76 for automatic ejection of the handle when latch 62 is moved to release the handle.

Referring to FIGS. 6 and 7, in conjunction with FIGS. 4 and 5, the invention includes complementary interengaging locking means between thermal control unit 10 and aircraft pod 12 for locking the control unit to the pod when properly positioned by locating means 16. The locking means includes locking ring 20 which was briefly mentioned above.

More particularly, locking ring 20 is generally V-shaped in cross-section in a radially inwardly opening direction. In other words, the locking ring includes a pair of inwardly diverging, circular or annular legs 80 and 82 extending peripherally about the interface between thermal control unit 10 and aircraft pod 12. The circular legs 80 and 82 embrace circular or annular flanges 84 and 86, respectively, formed at the projecting radially outwardly of the interface surfaces of pod 12 and control unit 10, respectively. It can be seen that annular flanges 84 and 86 have surfaces engaging the inner faces of annular legs 80 and 82 at more acute angles to provide a secure clamping action. The locking ring is rotatable relative to the thermal control unit and aircraft pod by means of handle 18 into locking position, as described hereinafter, which coincides with the position for handle 18 to be pivoted into its storing recess 52.

Referring to FIG. 7, it can be seen that circular or annular leg 80 of locking ring 20 is continuous or unbroken so that the locking ring is permanently mounted on aircraft pod 12 by seating engagement behind circular or annular flange 84 of the pod. However, the locking ring is free to rotate about the pod. Circular or annular ring 82 of locking ring 20 is segmented to form locking segments 88 between spaces or notches 90.

FIG. 6 shows that circular or annular flange 86 at the interface of thermal control unit 10 is provided with locking segments 92 angularly spaced between recesses or slots 94. Locking segments 92 and recesses 94 are angularly spaced complementary to the angular spacing of locking segments 88 and recesses 90 (FIG. 7) of locking ring 20. Therefore, upon positioning the thermal control unit into engagement with the aircraft pod, locking ring 20 simply is placed in position so that locking segments 92 on control unit 10 pass through recesses 90 of locking ring 20. During such positioning movement, guide pin 38 (FIG. 4) will move into guide recess 50 to properly locate the control unit with respect to the pod as the control unit initially was hung on hanger 40.

In order to completely lock the thermal control unit to the pod, locking ring 20 is rotated by handle 18 until the locking segments 88 thereof lock behind locking segments 92 (FIG. 6) of the control unit. The relative angular spacing between the locking segments on the control unit and the locking segments on the rotatable locking ring are such that when in fully locked condition, handle 18 is in alignment with recess 52 (FIG. 5) such that the handle can be pivoted and stored in the recess and held therein by latch 62.

Fluid connections 34 and electrical connections 36 on thermal control unit 10 are automatically interconnected with complementary fluid and electrical connections on aircraft pod 12 in response to proper positioning and locking of the control unit to the pod. No other extraneous connections are required.

From the foregoing, it can be seen that thermal control unit 10 is easily and quickly located, positioned and locked to aircraft pod 12 without any tools whatsoever and the fluid and electrical connections between the control unit and pod are automatically interconnected in response to such positioning and locking. This is accomplished in a matter of minutes to save precious time when dealing with adverse conditions on the flight line to achieve serviceability and maintainability not heretofore available.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An environmental control system for affording quick attachment and disconnection of a thermal control unit with respect to an aircraft pod and like vehicular substructures, comprising:

hanger means on the aircraft pod for initially hanging a locating member on the thermal control unit for initially positioning the control unit with respect to the pod and to allow the control unit to be easily lowered into proper mating position with respect to the pod; and means for locking the control unit to the pod when so properly positioned.

2. The environmental control system of claim 1 wherein said hanger means are located near the top edge of the aircraft pod.

3. The environmental control system of claim 1 wherein said locating member comprises a transverse pivot member for positioning on the hanger means to allow the control unit to be easily lowered by pivoting into proper position with respect to the pod.

4. An environmental control system for affording quick attachment and disconnection of a thermal control unit with respect to an aircraft pod and like vehicular substructures, comprising:

hanger means on the aircraft pod for initially hanging a locating member on the thermal control unit, the hanger means being located near the top edge of the aircraft pod, and the locating member comprising a transverse pivot member for positioning on the hanger means to allow the control unit to be easily lowered by pivoting into proper position with respect to the pod;

means for locking the control unit to the pod when so properly positioned; and complementary fluid connections and electrical connections on the thermal control unit and the aircraft pod, the connections being located for interconnection automatically in response to positioning and locking the control unit to the pod.

5. The environmental control system of claim 4, including means between the thermal control unit and the aircraft pod for guiding the control unit into proper position.

6. The environmental control system of claim 5 wherein said guide means include at least one guide pin on one of the control unit and pod and a mating guide aperture on the other of the control unit and pod for receiving the guide pin.

7. An environmental control system for affording quick attachment and disconnection of a thermal control unit with respect to an aircraft pod and like vehicular substructures, comprising:

means for complementarily interengagingly locating the thermal control unit on the aircraft pod for properly positioning the control unit with respect to the pod;

means for locking the control unit to the pod when so properly positioned, including a rotatable peripheral locking ring on one of the control unit and pod and having angularly spaced locking segments and a stationary locking member on the other of the control unit and pod in the form of at least one angular locking segment for locking engagement with the locking segments of the locking ring, the locking ring being generally V-shaped in cross-section in a radially inwardly opening direction for embracing radially outwardly projecting, annular flange means on both the thermal control unit and the aircraft pod, one leg of the V-shaped forming a continuous circular flange to permanently mount the locking ring behind the flange means of the one of the control unit and pod, and the other leg of the V-shaped being formed with said angularly spaced locking segments; and complementary fluid connections and electrical connections on the thermal control unit and the aircraft pod, the connections being located for interconnection automatically in response to positioning and locking the control unit to the pod.

8. The environmental control system of claim 7 wherein the flange means of the other of the control unit and pod is formed with a plurality of angularly spaced locking segments for interlocking engagement with the locking segments of the locking ring.

9. The environmental control system of claim 7, including handle means for manually rotating said locking ring.

10. The environmental control system of claim 9 wherein said handle means are pivotally mounted on the locking ring for swinging movement about a generally tangentially extending axis.

11. The environmental control system of claim 10, including latch and release means on one of the thermal control unit and aircraft pod for holding the handle in a locked condition to prevent rotation of the locking ring.

12. The environemental control system of claim 11 wherein said latch and release means are located in conjunction with recess means for receiving the handle means.

13. An environmental control system for affording quick attachment and disconnection of a thermal control unit with respect to an aircraft pod and like vehicular substructures, comprising:

hanger means on the aircraft pod for initially hanging a locating member on the thermal control unit for initially positioning the control unit with respect to the pod and to allow the control unit to be easily lowered into proper mating position with respect to the pod;

a rotatable locking member on one of the thermal control unit and aircraft pod and at least one stationary locking member on the other of the control unit and pod having means for interlocking with the rotatable locking member in response to rotation thereof for locking the control unit to the pod when properly positioned; and complementary fluid connections and electrical connections on the thermal control unit and the aircraft pod, the connections being located for interconnection automatically in response to positioning and locking the control unit to the pod.

14. The environmental control system of claim 13, including complementary interengaging guide means between the thermal control unit and the aircraft pod for guiding the control unit into proper position.

15. The environmental control system of claim 14 wherein said guide means include at least one guide pin on one of the control unit and pod and a mating guide aperture on the other of the control unit and pod for receiving the guide pin.

16. The environmental control system of claim 13 wherein said hanger means are located near the top edge of the aircraft pod.

17. The environmental control system of claim 13 wherein said rotatable locking member comprises a peripheral locking ring having angularly spaced locking segments, and at least one said stationary locking member being in the form of an angular locking segment for locking engagement with the locking segments of the locking ring.

18. The environmental control system of claim 17 wherein said locking ring is generally V-shaped in crosssection in a radially inwardly opening direction for embracing radially outwardly projecting, annular flange means on both the thermal control unit and the aircraft pod, one leg of the V-shape forming a continuous circular flange to permanently mount the locking ring behind the flange means of one of the control unit and pod, and the other leg of the V-shaped being formed with said angularly spaced locking segments.

19. The environmental control system of claim 18 wherein the flange means of the other of the control unit and pod is formed with a plurality of angularly spaced locking segments for interlocking engagement with the locking segments of the locking ring.

20. The environmental control system of claim 19, including handle means for manually rotating said locking ring.

21. The environmental control system of claim 20 wherein said handle means are pivotally mounted on the locking ring for swinging movement about a generally tangentially extending axis.

* * * * *